Jan. 14, 1930.  D. ZASLOVE  1,743,873
FALSE TOOTH
Filed Aug. 12, 1925
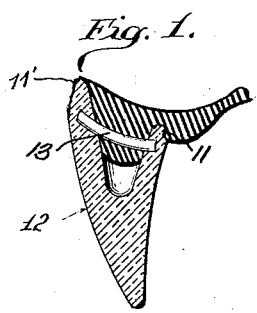
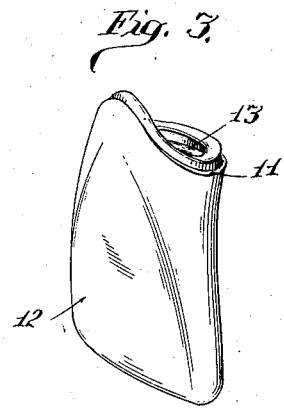
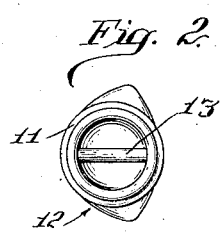
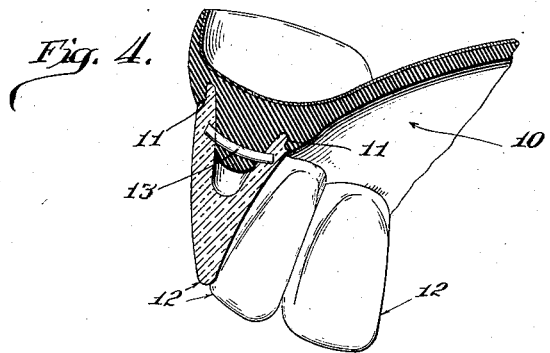
Inventor
David Zaslove
By Daniel J Brennan
Attorney Patented Jan. 14, 1930

1,743,873

UNITED STATES PATENT OFFICE

DAVID ZASLOVE, OF CHICAGO, ILLINOIS

FALSE TOOTH

Application filed August 12, 1925. Serial No. 49,767.

This invention relates broadly to improvements in artificial teeth and means for reinforcing and securing them firmly in a denture plate.

An object of the invention is to provide a tooth having a substantially annular groove around its outer surface adjacent its base to engage a denture plate, thus defining the uppermost part of the denture plate that completely surrounds each tooth individually.

Another object of the invention is to provide a hollow tooth with a re-inforcing member or pin preferably of metal, disposed transversely of and within the cavity in said tooth.

Another object of the invention is to construct or make a tooth full crown that is simple of manufacture, and held in a denture plate more firmly than by the known means, and presents a more natural colored tooth due to the provision of a pocket formed in the tooth below the gum or ridge.

In the drawings:

Fig. 1 is a vertical section through a tooth adapted to be used, where the anterior or front of the denture is formed without a gum abutting the top of the anterior gingival portion.

Fig. 2 is a bottom view of the tooth showing the re-enforcing pin.

Fig. 3 is a perspective view of the tooth showing the groove surrounding the base or gingival end.

Fig. 4 is a perspective view showing the teeth mounted in a denture plate, having a portion projecting over both the anterior and posterior surfaces of the gingival ends to engage grooves provided therein.

Ordinarily a denture plate is made of vulcanized rubber, and the teeth are mounted, therein having the denture plate rubber surrounding each individual tooth in the front, but on the anterior side or inner or posterior side the plate is banked against all of the teeth as a whole, thus giving the teeth a dead appearance and impairing their transparency as well as impairing the speech.

The inventor has aimed to improve this method of securing the teeth in the denture plate 10, by providing a substantially annular groove 11 near the base of each of the teeth 12, to engage the denture plate thus forming a complete surrounding for and defining each individual tooth thereby providing an improved setting of firm construction that will not impair the speech nor appearance of the teeth.

A pin 13 is provided in the cavity of each tooth near the base or gingival end to provide stiffening means to more securely engage with the denture plate. This pin may be integral with the tooth or it may be a separate metal pin put in when the tooth is moulded or afterwards by any suitable means.

In practice the substantially annular groove is provided on all the teeth except the front six where the groove does not extend all the way around as illustrated in Fig. 1 at 11', but for only a portion of the distance or in the front of said teeth the groove is very slight, especially where the denture plate is not provided with a gum in front, or a plurality of short grooves may be provided. The pressure on the front six teeth is outward, caused by the bite, for that reason the groove is not absolutely necessary on these teeth.

It will be noted that the pin 13 is downwardly bowed or bent toward the bottom of the cavity in the tooth and also traverses said cavity in an inwardly and outwardly direction with reference to the mouth cavity. The tooth illustrated in Fig. 1 is an incisor or front tooth and the biting strain or reaction on such a tooth is upwardly and outwardly, that is, along the general direction of the pin 13 so that said pin is thus disposed in the most advantageous direction to resist such strains or reactions. It is also to be noted in Fig. 4 that the material of the denture plate 10 is forced into the groove 11 and also into the cavity of the tooth sufficiently to surround or embed the pin 13 and whereby the tooth is securely fastened and wedged in position on said plate. By giving the pin 13 a downward bend or bow the said pin is prevented from rotation or pivoting in its bore in the denture plate. It will also be observed that it is easier to force the material of the plate 10 to flow into the cavity in the tooth at the center of the cavity than it is along the walls thereof, so that the downward bowing of the pin 13 carries the anchoring effect as far as possible in toward the center of the tooth and removes the downwardly bowed center portion of the pin from proximity to the walls of the cavity, thereby facilitating the flow of the material of the denture plate around the central portion of the pin.

While the invention has been illustrated and described in the preferred form of construction for carrying it out it is capable of variations and modifications, without departing from the spirit of the invention. Therefore, it is not desired to be limited to the precise details set forth, but to take advantage of all variations and modifications that come within the scope of the appended claims.

I claim:

1. In combination, a denture plate; a hollow incisor tooth having a cavity extending from the base into the interior thereof; and a pin traversing said cavity in a labio-lingual direction, said pin being bowed toward the bottom of the cavity and having its ends anchored in the front and rear walls of said tooth, the material of said plate being forced into said cavity sufficiently to surround and embed said pin.

2. In combination, a denture plate; a hollow incisor tooth having a cavity extending from the base into the interior thereof, there being also a shallow groove around the base of said tooth at the rear and sides thereof but omitted from the front; and a metal pin traversing said cavity in a labio-lingual direction, said pin being bowed toward the bottom of the cavity, the material of said plate being forced into said groove and also into said cavity sufficiently to surround and embed said pin.

3. An artificial tooth having a cavity extending from the base into the interior thereof; and a metal pin traversing said cavity in a labio-lingual direction, said pin being anchored in two walls of the tooth.

4. An artificial tooth having a cavity extending from the base into the interior thereof; and a metal pin traversing said cavity in a labio-lingual direction, said pin being bowed toward the bottom of said cavity and being anchored in the front and rear walls of said tooth.

5. In combination, a denture plate, a hollow tooth having a cavity extending from the base into the interior thereof, and a metal pin traversing said cavity, said pin having its ends secured in the front and rear walls respectively, of the tooth, the material of said plate being forced into said cavity sufficiently to surround and embed said pin.

In testimony whereof I affix my signature at 10 South La Salle Street, Chicago, Illinois.

DAVID ZASLOVE.